(12) United States Patent
Rocha

(10) Patent No.: US 9,049,855 B2
(45) Date of Patent: Jun. 9, 2015

(54) INSECT TRAP HAVING AN AIR-ACTUATED DAMPER

(71) Applicant: Dynamic Solutions Worldwide, LLC, Milwaukee, WI (US)

(72) Inventor: Juan J. Rocha, Lake Forest, IL (US)

(73) Assignee: Dynamic Solutions Worldwide, LLC., Milwaukee, WI (US)

( * ) Notice: Subject to any disclaimer, the term of this patent is extended or adjusted under 35 U.S.C. 154(b) by 172 days.

(21) Appl. No.: 13/680,527

(22) Filed: Nov. 19, 2012

(65) Prior Publication Data

US 2014/0137462 A1 May 22, 2014

(51) Int. Cl.
*A01M 1/08* (2006.01)
*A01M 1/02* (2006.01)

(52) U.S. Cl.
CPC *A01M 1/023* (2013.01); *A01M 1/08* (2013.01)

(58) Field of Classification Search
USPC ........ 43/107, 110, 111, 113, 118, 132.1, 133, 43/138, 139, 73, 74
IPC .................... A01M 1/02,1/04, 1/06, 1/08, 1/10, A01M 1/12
See application file for complete search history.

(56) References Cited

U.S. PATENT DOCUMENTS

| | | | |
|---|---|---|---|
| 1,807,550 A | 5/1931 | Rector | |
| 2,236,698 A | 5/1940 | Rector | |
| 2,893,161 A | 7/1959 | Reid | |
| 3,987,578 A | 10/1976 | Rueff | |
| 4,282,673 A | 8/1981 | Focks et al. | |
| 4,788,789 A | 12/1988 | Boobar et al. | |
| 4,794,725 A | 1/1989 | Numerick | |
| 5,157,865 A | 10/1992 | Chang | |
| 5,255,468 A | 10/1993 | Chesire, Jr. | |
| 5,329,725 A * | 7/1994 | Bible | 43/113 |
| 6,199,315 B1 | 3/2001 | Suzue et al. | |
| 6,871,445 B2 | 3/2005 | Bertani | |
| 6,990,768 B1 * | 1/2006 | Boston | 43/132.1 |
| 7,036,269 B1 | 5/2006 | Chen et al. | |
| 8,240,082 B1 | 8/2012 | Fall | |
| 8,479,438 B1 * | 7/2013 | Wilhelmi | 43/121 |
| 2005/0060926 A1 * | 3/2005 | Lee et al. | 43/113 |
| 2008/0168702 A1 | 7/2008 | Jaffrey | |
| 2011/0030266 A1 * | 2/2011 | Roy et al. | 43/113 |
| 2011/0283597 A1 | 11/2011 | Coventry | |

FOREIGN PATENT DOCUMENTS

| | | |
|---|---|---|
| KR | 1020020021466 | 3/2002 |
| KR | 1020110038890 | 4/2011 |
| KR | 1020120078220 | 7/2012 |

OTHER PUBLICATIONS

Insect Trap Having an Air-Actuated Damper.

* cited by examiner

*Primary Examiner* — Darren W Ark
*Assistant Examiner* — Lisa Tsang
(74) *Attorney, Agent, or Firm* — Boyle Fredrickson, S.C.

(57) ABSTRACT

A device for trapping insects includes a cover and a trap or cage that are disposed at opposite ends of a housing. A fan is disposed in the housing and oriented to direct an airstream through the housing and toward the trap. A damper is disposed in the airstream proximate the trap and includes two independently operable doors. Each door is biased toward a closed position and opens during operation of the fan. Insects in the proximity of the device are overpowered by the airflow and blow into the trap and retained therein by the airflow or the closed orientation of the damper doors. The trap removably cooperates with the housing to facilitate disposal of insects captured therein.

10 Claims, 6 Drawing Sheets

INSECT TRAP HAVING AN AIR-ACTUATED DAMPER

BACKGROUND OF THE INVENTION

This invention relates to a method and apparatus for trapping insects. In particular, it relates to an insect trap which utilizes multiple attractants and a unique air-actuated two-piece damper that traps insects within the confines of the trap.

Suction-type insect traps utilize a suction mechanism, such as a fan disposed in a chamber, to draw or blow air into the trap and capture any insects that are caught in the flow of air associated with operation of the fan. Then, the captured insects must usually be retained or housed in a closed space to prevent escape of insects from the trap. An attractant may be used to lure insects to the air flow. Without such an attractant, only those insects that are exposed to the air flow via happenstance can commonly be captured.

The prior art teaches the use of a variety of attractants, such as heat, water vapor, or carbon dioxide, to lure insects into the vicinity of a trap. These attractants simulate the elements that are found in the breath and sweat of warm-blooded mammals, the target of many biting and/or blood-sucking insects. Many insects are also attracted to light and will gather around light sources. Thus, the effectiveness of such insect traps depends largely on the combined effectiveness of the attractant, the suction or air flow mechanism, and the insect retaining cage.

While carbon dioxide has been known to be used as an attractant, methods of carbon dioxide dispersion have been less commercially viable. Carbon dioxide gas used as an attractant is typically provided by pressurized tanks or by the sublimation of dry ice. While these methods supply carbon dioxide, they have not been commercially viable options since they are heavy and occupy a lot of space.

An effective trap may involve a quiet yet powerful fan, but the trap must also be constructed so that insects are not able to escape once they are trapped within the confines of the trap. In particular, it is desirable for the insects to not escape when the fan is powered off and there is no longer any suction mechanism in effect within the trap.

SUMMARY OF THE INVENTION

The present invention provides an apparatus and method concerning an improved insect trap that can utilize multiple methodologies to lure and trap insects in a trap housing. In particular, a three-way protection system involves: (1) one or more insect attractants; (2) an effective fan mechanism to overpower insects and direct them toward the trap; and (3) a secure retention mechanism that prevents escape of captured insects. The trap utilizes an air-actuated two-piece damper assembly which prevents insects from escaping the trap when the fan is turned off and when there is no air flow through the trap, but also allows insects to enter the retaining cage when the fan is turned on and when there is air flow through the trap.

It is desirable to have an insect trap that does not use pesticides or emit otherwise harmful chemicals into the environment. Thus, the present invention contemplates an insect trap that utilizes a suction vacuum in conjunction with multiple non-chemical attractants. This method provides an environmentally friendly and odor-free method to eliminate unwanted insects without being unduly obtrusion to the enjoyment of people who may be nearby.

Additionally, it is desirable to have an insect trap that ensnares the insects when the suction vacuum is turned off so that insects cannot escape. By doing so, the user is able to clean the trap or simply let the trap sit unpowered without insects escaping. Thus, the present invention contemplates an air-actuated damper which self-closes when the fan is off but provides adequate access to the insect cage during operation of the fan.

Additionally, it is desirable to have an insect trap that is lightweight, easy to install, and convenient to use. Thus, the present invention contemplates a trap that is made of durable yet lightweight materials (e.g., plastic or metal) that can be easily carried by the user and then placed or hung in an indoor or outdoor environment. The trap is also preferably constructed and packaged so that it does not require assembly by the user.

The insect trap contemplates different embodiments depending on if it is being tailored for indoor or outdoor use, and encompasses different features depending on the specific needs of the user. It is recognized that an insect trap may be suitable for indoor use, outdoor use, or both, and may not be limited by a single designation.

In at least one embodiment of the invention, the insect trap is used for outdoor use and provides protection of the operating components of the trap assembly from the natural elements. The outdoor-use insect trap comprises three main housing elements: a roof, a body, and a retaining cage. It is contemplated that the trap may be defined by other main housing elements.

In at least one embodiment of the invention, the outdoor-use insect trap has a rain roof which provides protection for the majority of the trap assembly from the natural elements, such as rain. The rain roof is attached to the body and may be removable or fixed. The attachment means for the rain roof may be vertical rods which suspend the roof above the body, or a securing mechanism that attaches the rain roof directly to the body. The rain roof is shaped to overlap the body and allow rain to run past the roof and fall past the body to prevent moisture from entering the interior of body. The rain roof may be constructed of a durable plastic or metal material. The rain roof or cover may have a transparent or translucent inlet or be constructed of a transparent or translucent material to allow light rays to emit beyond the trap assembly and attract insects.

In an alternative embodiment, the insect trap has a solar cell roof that utilizes the sun's rays to power the trap. The solar cell roof has a plurality of photovoltaic cells which converts the energy of light into electricity through a photovoltaic effect. This electricity is used to power, e.g., a light source and fan.

In at least one embodiment of the invention, the insect trap may be used indoors, and thus, the housing construction may differ. For traps used primarily indoors or outdoors during clement weather conditions, the rain roof serves simply as a cover and does not necessarily protect the body from the natural elements or may be wholly removed. It may not overlap the body, but instead, may be constructed to be flush with the body to provide a smooth contour.

Generally, the roof or cover serves as an attachment means for a light source, and the interior of the roof or cover may contain an electrical assembly to activate such light source. It is contemplated that the electrical assembly may be external to the insect trap or located in the trap body. The electrical assembly is connected to a power source, e.g., solar cell, A.C. power supply, or battery.

Additionally, the roof or cover provides an attachment means for a hook or handle so that the user can easily carry and transport the trap. In at least one embodiment of the invention, the roof has a suspension ring to allow the insect trap to be hung. In an alternative embodiment, the roof has a handle to allow the user to easily pick up and carry the trap.

In at least one embodiment of the invention, the insect trap has a body which is generally cylindrical in shape and has several elements located within the interior of the body. In at least one embodiment, one or more screens, a fan assembly, and a damper are located within the confines of the body. The body is constructed so that a vacuum air-flow is created by the fan assembly and the cylindrically shaped body. It is contemplated that other operational features may be located within the body.

The present invention contemplates several ways in which insects may enter the interior of the body. In at least one embodiment, the roof or cover is attached to the body by a plurality of stiff vertical rods, and insects enter the trap through the space between the rods. In an alternative embodiment, the roof or cover is coupled to the body through a screw mechanism or other attachment means directly onto the body. The upper area of the body then has vertical slots removed from the housing walls through which insects may enter the interior. These openings not only allow insects to enter the interior but also allow the light source to emit light rays to the outside of the trap.

In a preferred aspect, the upper portion of the body contains a first protective screen. The protective screen is disposed horizontally and covers the orifice of the body. It contains a plurality of air passages to allow insects and air to pass through. However, the slots are preferably small enough to prevent foreign objects (aside from insects) from contacting the fan. The protective screen may be constructed of a durable plastic or metal material.

Within the middle portion of the body is a fan assembly. The middle portion of the body contains a quiet yet powerful fan that draws insects into the body and down into the retaining cage. The fan is attached to the inner sidewall by an attachment means and is powered by a power source, e.g., solar cell, A.C. power supply, or battery. It is appreciated that the trap assembly could include a power source or be configured to receive power from an external source. Regardless of the source of the operating power, the fan blades preferably rotate in a horizontal direction. The fan may be constructed of a durable plastic or metal material.

In a preferred aspect, a second screen is located within the lower portion of the body. The screen is disposed horizontally and is located below the fan assembly. It contains a plurality of air passages to allow insects and air to pass through the screen. The screen may be constructed of a durable plastic or metal material.

Once insects enter the vicinity of the trap, the vacuum power of the fan sucks insects into the interior of the body and directs them in a downward direction toward the lower retaining cage. The retaining cage is removably attached to the bottom of the body and may lock in place. The cage is cylindrical in shape and is comprised of an open top portion and a closed bottom portion. The sidewalls of the cage may be lined with a mesh material as to allow airflow but prevent passage of insects through the sidewalls of the cage. Insects trapped in the cage eventually dehydrate and die.

In at least one embodiment of the invention, a damper feature prevents insects from escaping the trap when the fan is turned off or when there is no or only limited air flow through the trap. A damper assembly is located in the lower portion of the body or alternatively, in the upper portion of the retaining cage. The damper assembly prevents insects from escaping the trap when the fan is turned off or when there is insufficient air flow through the trap to open the damper—such as if the fan is damaged or otherwise rendered inoperable. The damper assembly is biased toward a closed position when the fan is off. The damper assembly is air-actuated so that it can achieve an open position when the fan is on. When the damper assembly is in a closed position, there is no insect-sized passage through the structure that defines the cage such that insects contained therein are unable to escape the cage. When the damper assembly is in an open position, the cage is accessible through the top opening and insects can enter the cage through the open damper doors or flaps.

The damper assembly has two damper flaps that are each shaped as semi-circles, and when in a closed position, form a circle that obstructs a circular passage or opening between the housing and the cage. It is appreciated that the damper flaps may be any shape to obscure the shape of the opening. The damper flaps are attached to the housing by pivot pins that are located on opposite sides of each flap's semi-circle arc although the flaps could alternatively be supported by the upper end of the cage. However, the pins are located inward from the straight edge. Located behind the damper flaps is a stop-bar which provides support to the damper flaps and prevents the flaps from swinging to an over-center position with respect to the axis defined by the pivot and the center of gravity of the respective flap. The stop bar also limits translation of the flaps from their intended locations during transport of the trap.

Each flap has a weighted rod located on the straight edge to create the appropriate weighted balance. The weighted rods may be constructed of a metal material.

In at least one embodiment of the invention, an on-off twist feature seals the unit openings when the fan is turned off so that insects are unable to escape. More particularly, a twist mechanism activates a covering which obscures the slot openings in the body.

The present invention contemplates the use of multiple attractants to lure insects to the insect trap. It is a goal of this invention to provide attractants that are inexpensive, easy to utilize, preferably replaceable and/or serviceable, yet effective. Thus, it is a feature of at least one embodiment of the invention to utilize a light source which is attached to the interior of the roof or cover. The light source is electrically coupled to a power source. When the light is on, the light rays attract insects from far and wide. A variety of different types of light sources may be used, e.g., UV fluorescent light bulbs, LEDs.

The present invention also contemplates the use of a substance which releases carbon dioxide into the air. In at least one embodiment of the invention, the sidewalls of the body are coated with titanium dioxide, a substance which undergoes a photocatalytic reaction when it comes into contact with UV light, and thereafter releases carbon dioxide and water vapor. The carbon dioxide and water vapor is disseminated by the fan and attracts insects to the trap. The present invention contemplates that other substances may be used to emit carbon dioxide.

The present invention also contemplates the use of water to draw egg-laying insect. The insect trap may have a water tray, typically for outdoor use, coupled to the insect trap housing, which collects rain water in order to lure egg-laying insects to the vicinity of the trap. The water tray may or may not be removable.

In an alternative embodiment, an indoor use trap is made to easily mount on a wall or lie flat on a table, countertop, or shelf. The housing is made of two parts that are coupled together to provide a smooth outer contour, and a back side that is made to mount flush with the wall. The upper portion contains a UV light source, a carbon dioxide releasing coating, and a fan. The upper portion has slotted openings to allow insects to enter the trap, and to allow light rays to escape. The lower portion contains a retaining cage which can be removed from the assembly to clean out the contents. The lower portion also has slotted openings to allow air flow through the bottom, however, the openings do not allow insects to escape. It is contemplated that the trap may also contain a damper assembly to trap insects within the trap.

It is contemplated that the insect trap can be used continually and can be used to catch a variety of insects, e.g., mosquitoes, biting flies, Asian beetles, wasps, hornets, yellow jackets, moths, stink bugs, and other flying insects. It is further contemplated that the insect trap assembly can be provided in a variety of colors to satisfy user preferences and can be configured to be hung from a pole stand, mounted to a wall, hung from a chain, or placed on the ground or on a table during operation.

These and various other features and advantages of the present invention will be made apparent from the following detailed description and the drawings.

BRIEF DESCRIPTION OF THE DRAWINGS

The drawings illustrate one preferred embodiment presently contemplated for carrying out the invention.

In the drawings.

DETAILED DESCRIPTION OF THE DRAWINGS

Figure 1:
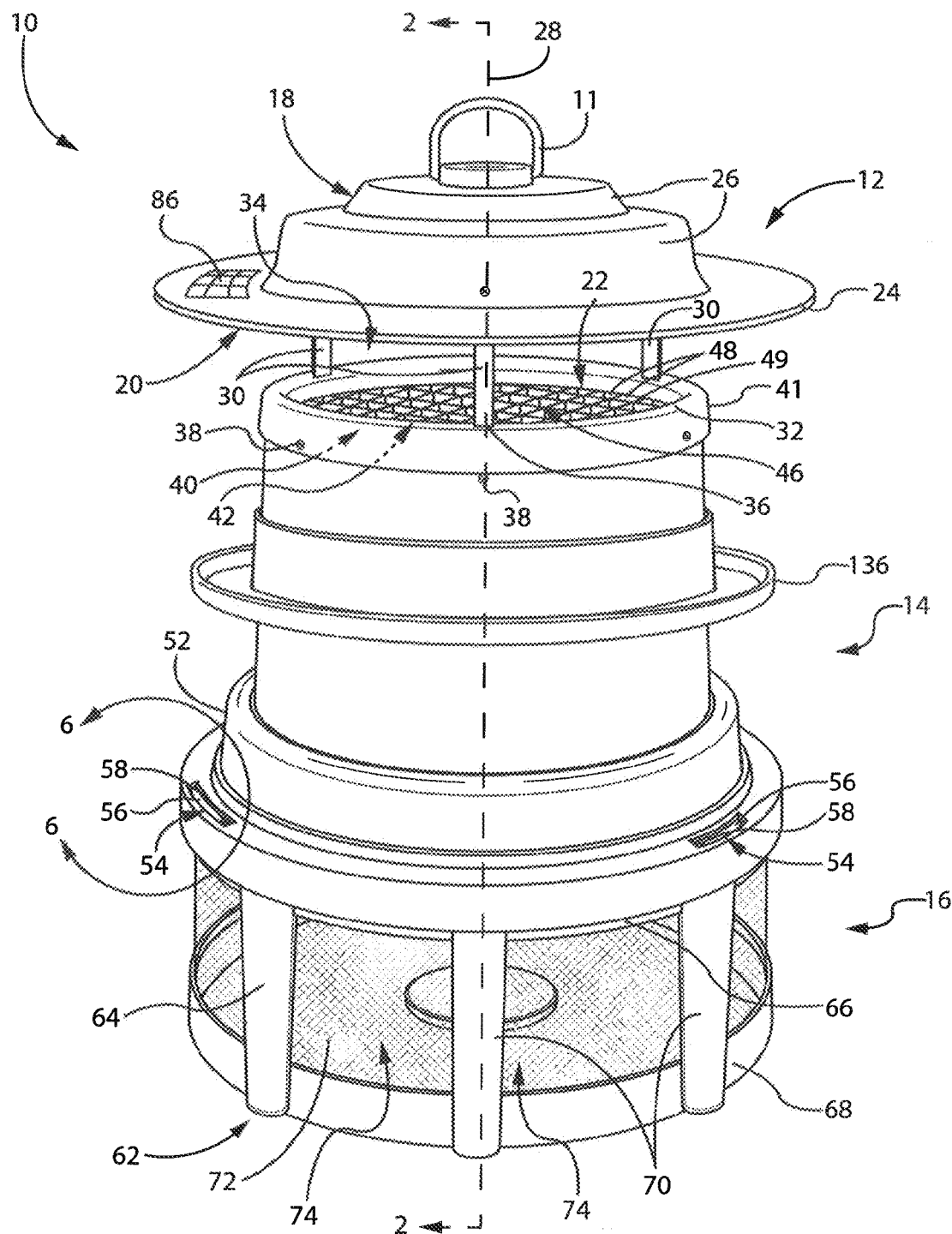
FIG. 1 is a perspective side view of an insect trap assembly according to the present invention.

FIG. 1 shows an insect trap assembly 10 according to the present invention. Insect trap assembly 10 includes a cover or a roof 12 that generally overlies a housing body or housing 14 and a trap or cage 16 that is removably connected to housing 14 and constructed to retain insects. Roof 12 includes an exterior surface 18 that is oriented to face an operating environment and an interior surface 20 that generally underlies exterior surface 18 and faces a top surface 22 of housing 14. Roof 12 includes a perimeter 24 that defines a footprint of roof 12. Although shown as generally circular, it is appreciated that perimeter 24 could have any shape.

Still referring to FIG. 1, exterior surface 18 of roof 12 is bounded on its radial edges by perimeter 24 and includes a number of ridges, contours, or tiers 26 that extend in a gravitational direction relative to the intended orientation of roof 12 during use of trap assembly 10. Although shown as having a generally upward directed convex shape, it is appreciated that exterior surface 18 of roof 12 could have a concave or toroidal shape with respect to perimeter 24 and a centerline, indicated by line 28, of assembly 10. Such a construction would allow roof 12 of trap assembly 10 to retain an amount of water, whether provided by a user or as rainfall, to attract insects to trap assembly 10. As explained further below, one aspect of the present invention is to provide a number of insect attractants so as to draw intended targets to the trapping device. Water is only one such attractant and can be provided by roof 12 of assembly 10, as explained above, and/or provided by other structures associated with housing 14 and/or cage 16.

A number of posts 30 extend between interior surface 20 of roof 12 and top surface 22 of housing 14. Posts 30 are preferably spaced about a circumference associated with a radial perimeter 32 of top surface 22 of housing 14. Posts 30 define a gap 34 between interior surface 20 of roof 12 and top surface 22 of housing 14. As explained further below, gap 34 is shaped to allow insects to pass into the space between roof 12 and housing 14 and to be drawn and/or forced through the operational features of trap assembly 10. It is appreciated that although three posts 30 are shown, other numbers of posts may be provided to create the offset or gap 34 between roof 12 and housing 14.

The roof 12 preferably contains a hanging ring 11 in the middle of its exterior surface 18 for hanging the trap 10 by a hook or other mounting apparatus. It is appreciated that there may be alternative ways to mount trap 10, such as by a pole stand or hung from a chain. It is also appreciated that the mounting means may be located at other areas of trap 10 besides the roof 12, such as on housing 14.

The roof 12 optionally contains solar cell 86 for powering the various electrical components located in or on trap 10. It is appreciated that there may be a varying number of solar cells 86 and that they may be located anywhere on trap 10, such as on roof 12 or housing 14.

Still referring to FIG. 1, the radial perimeter 32 of housing 14 receives posts 30 through corresponding receiving holes 36 spaced about a circumference associated with the radially positioning of posts 30. The posts 30 are fixed within holes 36 by an attachment means, such as bolts or screws 38, to prevent vertical movement of posts 30. It is contemplated that posts 30 may be fixed by other means, such as by welding or an adhesive. The posts 30 are extended downward into holes 36 to a depth that is able to receive an attachment means, such as screws 38.

The radial perimeter 32 is constructed of a reinforced plastic to provide radial strength to housing 14 and support for the weight of the upper elements. The radial perimeter 32 may be a sleeve 41 with a cavity 40 to receive the upper perimeter 42 of the housing 14 within the cavity 40. The sleeve 41 is slid over the upper perimeter 42 to receive the edge of the upper perimeter 42. The sleeve 41 may be fixedly attached to the housing body by bolts or screws 38, or other attachment means. It is appreciated that the radial perimeter 32 may alternatively be a piece that is attached parallel to the upper perimeter 42 by a fastening means, such as a bolt or screw. It is also appreciated that the radial perimeter 32 may be provided as either a piece separate from housing 14, or a reinforced edge on housing 14 itself. Further, although housing 14 is shown to have a generally cylindrical shape, it is appreciated that housing 14 could have any shape.

Figure 2:
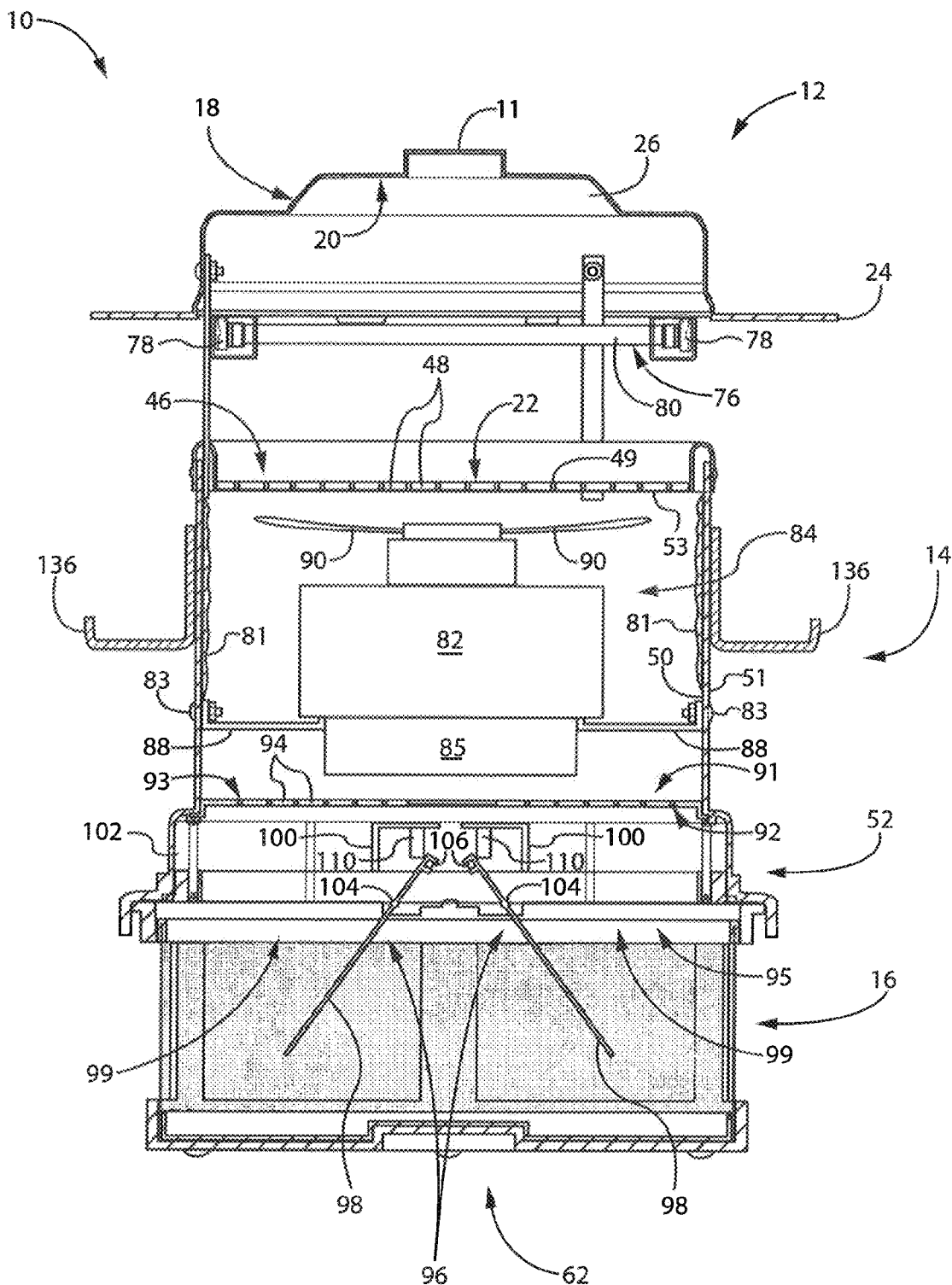
FIG. 2 is a partial side elevation cross-section view of the insect trap assembly taken along line 2-2 shown in FIG. 1.

Referring to FIG. 1 and FIG. 2, a screen or a first protective screen 46 is disposed across the top surface 22 of housing 14. First protective screen 46 includes an exposed top surface 49 that faces the interior surface 20 of the roof 12 and a bottom surface 53 that underlies the top surface 49 and faces inwardly into the interior 84 of housing 14. The protective screen 46 is grated to provide for a plurality of preferably small openings 48 that allow air flow and small insects to pass through screen 46, but do not allow larger foreign objects to pass there beyond. The protective screen 46 is coupled to the inner wall 50 of the housing 14 and suspended over the entire top surface 22 of housing 14.

Insects attracted to the trap are drawn into the trap 10 through the gap 34 between posts 30 and enter the space between roof 12 and housing 14. Insects then enter the housing 14 by passing through the openings 48 of protective screen 46 and pass to the interior 84 of housing 14. The insects pass the operational features disposed in the interior 84 of housing 14 and exit the housing 14 by passing downward through a bottom base 52 of housing 14 and into the attached retaining cage 16.

Figure 5:
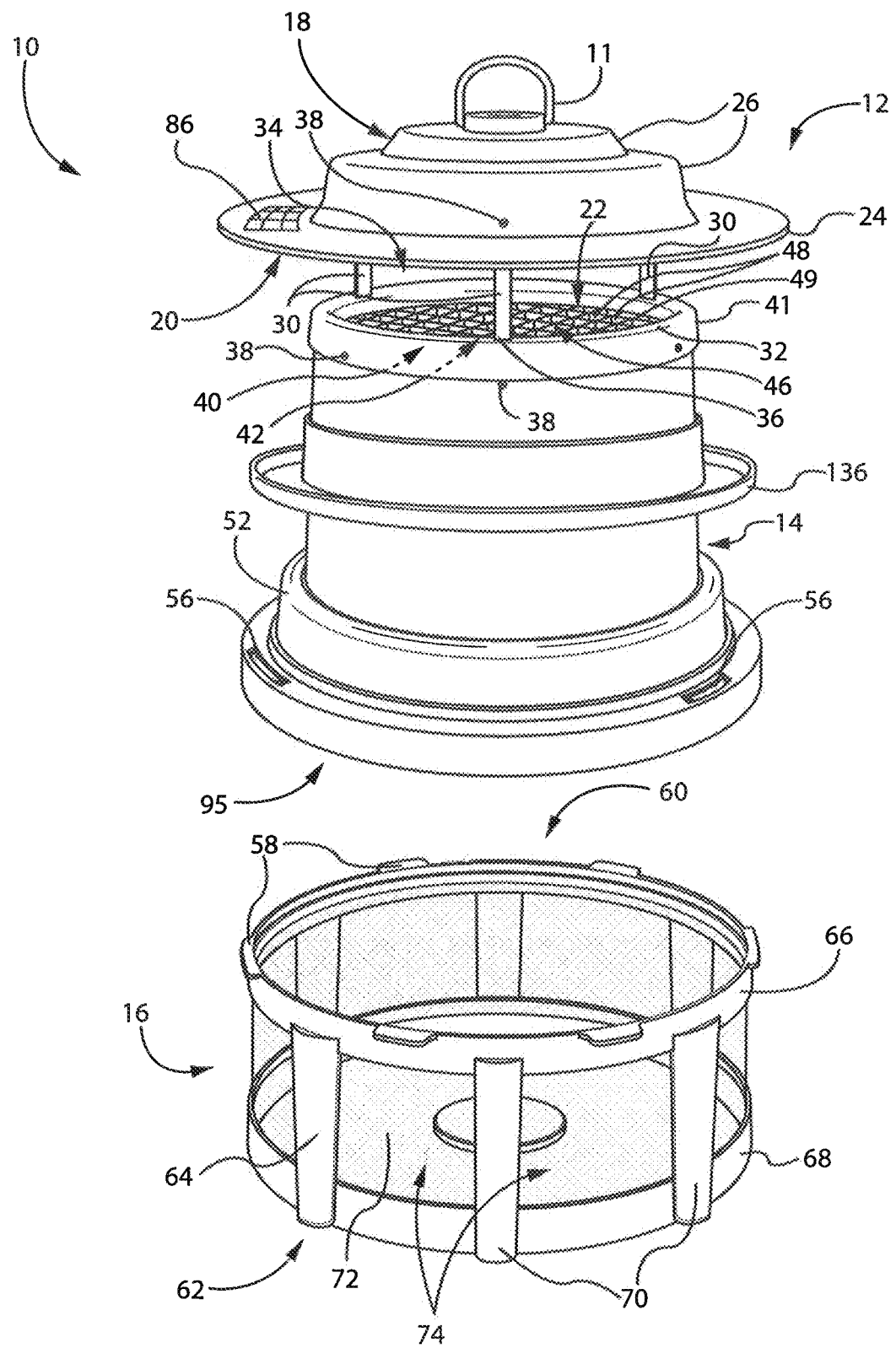
FIG. 5 is a view similar to FIG. 1 and shows a removable retaining cage exploded from the insect trap assembly.

Referring to FIG. 1 and FIG. 5, bottom base 52 of housing 14 has a generally cylindrical shape and corresponds to the shape of the housing 14 but widens in a concave manner to provide an expanding diameter orifice or opening 95. It is appreciated that bottom base 52 may be shaped in a number of ways and may not expand in diameter. The bottom base 52 is sized to overlap the upper perimeter 66 of retaining cage 16 to securely couple the housing 14 to the retaining cage 16. The bottom base 52 may also have a locking mechanism 54 consisting of locking holes 56 for receiving corresponding lock pieces 58 of the retaining cage 16.

The retaining cage 16 is disposed below the housing 14 and fixably attached to capture insects exiting the bottom base 52 of housing 14. As insects exit bottom base 52, they are retained within the confines of cage 16. The cage 16 is a generally drum-shaped structure with an open top 60 and closed bottom 62. It is supported by a frame 64 that has an upper perimeter 66, lower perimeter 68 and connecting rods 70 that connect the upper 66 and lower 68 perimeters. The connecting rods 70 are preferably spaced about a circumference associated with a radial perimeter of cage 16. A mesh netting 72 is lined within the interior of the retaining cage 16 to cover the spaces 74 created between rods 70. The netting 72 prevents insects from escaping the retaining cage 16, visual inspection of the contents of the cage 16 by a user, and allows the air directed housing 14 to egress trap assembly 10.

Referring to FIG. 2, trap assembly 10 is configured for operation with a number of optional attractants. One such attractant is the generation of light rays. A light assembly 76 is coupled to the interior surface 20 of roof 12 by one or more mounting brackets 78. The interior surface 20 may attach mounting brackets 78 to receive the ends of one or more UV light bulbs 80 or other light sources. It is appreciated that there are alternative ways to mount light bulbs 80 within the interior surface 20 of roof 12, and that the light assembly may be mounted on different areas on the trap 10. The light assembly 76 is attached to a power source, such as an AV power supply, battery source, or solar powered cells. The power source may be located on or in trap 10 or externally provided.

Another attractant contemplated is carbon dioxide or a carbon dioxide releasing substance 81. The inner wall 50 of the housing is coated with a substance 81, such as titanium dioxide, which releases carbon dioxide when exposed to UV light rays. It is appreciated that other carbon dioxide releasing substances may be used as attractants to draw insect into the trap's vicinity. It is also appreciated that the substance may be coated at various locations on the trap, such as on the interior surface 20 of roof 12 or on the exterior surface of housing 14 to name but a few.

Another attractant contemplated is sitting water, which may be provided by a water tray 136 coupled to the exterior surface 51 of housing 14 to collect water. The water tray 136 may be removable or permanent and may be attached to the housing 14 via a number of methods, such as by screws or by being slidably fitted around the housing's 14 circumference.

Insects that enter housing 14 by passing through the openings 48 of protective screen 46 pass through a number of operational features located in the interior 84 of housing 14. Within the interior 84 of housing 14 is a fan assembly 82 which is fixably attached to the inner wall 50 of housing 14 by bolts 83, or the like, and suspended in the middle of the interior 84. The fan assembly 82 is attached to the inner wall 50 by a number of rigid suspension rods 88 that are bolted to inner wall 50 and attached to the bottom portion 85 of fan assembly 82. The suspension rods 88 are located so that they do not interfere with movement of blades 90 of the fan assembly 82.

The fan assembly 82 has rotatable blades 90 that preferably rotate in a horizontal plane that is aligned between the first protective screen 46 and a second protective screen 91. It is contemplated that blades 90 may be provided at different pitches in order to create the desired air flow or vacuum effect. It is also contemplated that the fan assembly 82 may be located at different locations within the interior 84 of housing 14. That is fan assembly 82 need not be centrally located and/or can be disposed nearer one of screens 46, 91.

Second protective screen 91 is disposed below fan assembly 82 and includes an upper surface 93 that faces inwardly toward the housing interior 84 and a bottom surface 92 that generally underlies upper surface 93 and faces a damper assembly 96. Protective screen 91 is grated to provide for a plurality of small openings 94 that allow air flow and small insects to pass through the openings 94. The protective screen 91 is coupled to the inner wall 50 of the housing 14 and is suspended over the entire bottom opening 95 of the housing 14. Screen 91 prevents unintended objects from inadvertently passing into housing 14 but is constructed to allow insects to pass fairly unobstructed therethrough.

A damper assembly 96 is coupled to bottom base 52. Damper assembly 96 includes two damper flaps 98 that each independently rotate between open and closed positions. The damper flaps 98 are preferably semi-circular to collectively cover the circular opening 95. When there is no air-flow through the trap 10, damper flaps 98 are in a closed position and cover the bottom opening 95 of the housing 14 to prevent insects from escaping retaining cage 16. When there is air-flow through the trap 10, damper flaps 98 are in an open position and provide a space 99 to allow insects to be passed into the retaining cage 16. In an open position, the damper flaps 98 extend to a position that is preferably less than ninety degrees and extend outwardly into the attached retaining cage 16. Full extension of the damper flaps 98 is limited by stop-bars 100 which provide support and prohibit movement of the flaps 98.

The bars 100 are attached to the inside wall 102 of bottom base 52 by pivot pins 104 that are attached inwardly from the straight edge 108 of flaps 98. Along each straight edge 108 are weighted rods 106 which are preferably made of a metal material, to create a desired weighted balance of each flap 98. When the fan assembly 82 is off, and/or the blades 90 are not rotating, the damper flaps 98 are in a closed position. When the fan assembly is on and the blades 90 are rotating, the damper flaps 98 are in an open position and moved there by the air-flow through trap assembly 10. It is appreciated that weighted rods 106 may be made of any weighted material. Regardless of the material they are constructed of, rods 106 are orientated relative to the respective flap 98 and pivot pins 104 to bias the respective flap toward the closed position.

Figure 3:
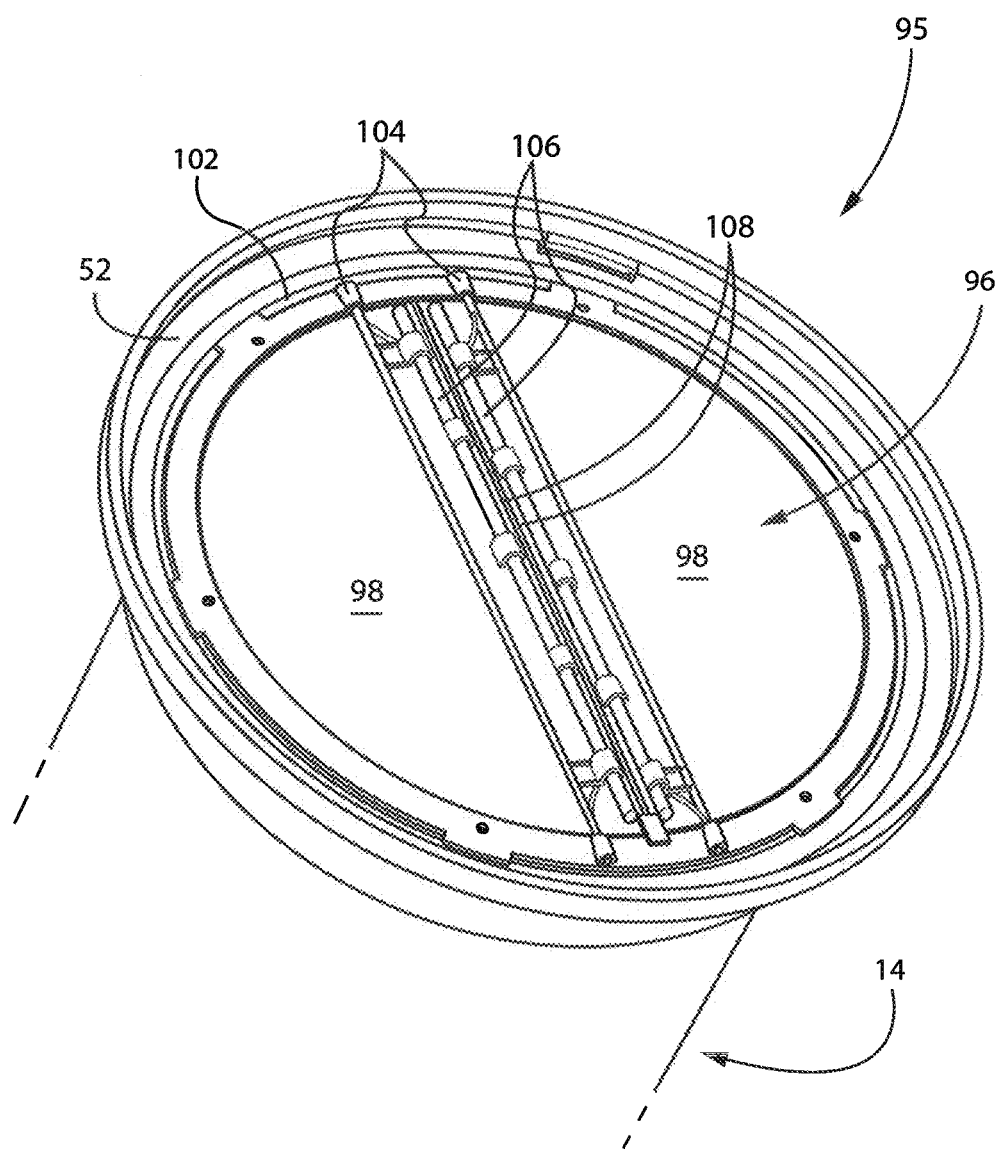
FIG. 3 is a perspective view of a damper assembly of the insect trap assembly shown in FIG. 1 with a pair of damper doors oriented in a closed position.

Referring to FIG. 3, the damper flaps 98 align at their straight edges 108 to completely conceal the opening 95 and prevent insects from escaping the retaining cage 16. The weighted rods 106 at the straight edge 108 of the flaps 98 bias the flaps 98 toward a closed position when no air is flowing through the trap.

Figure 4:
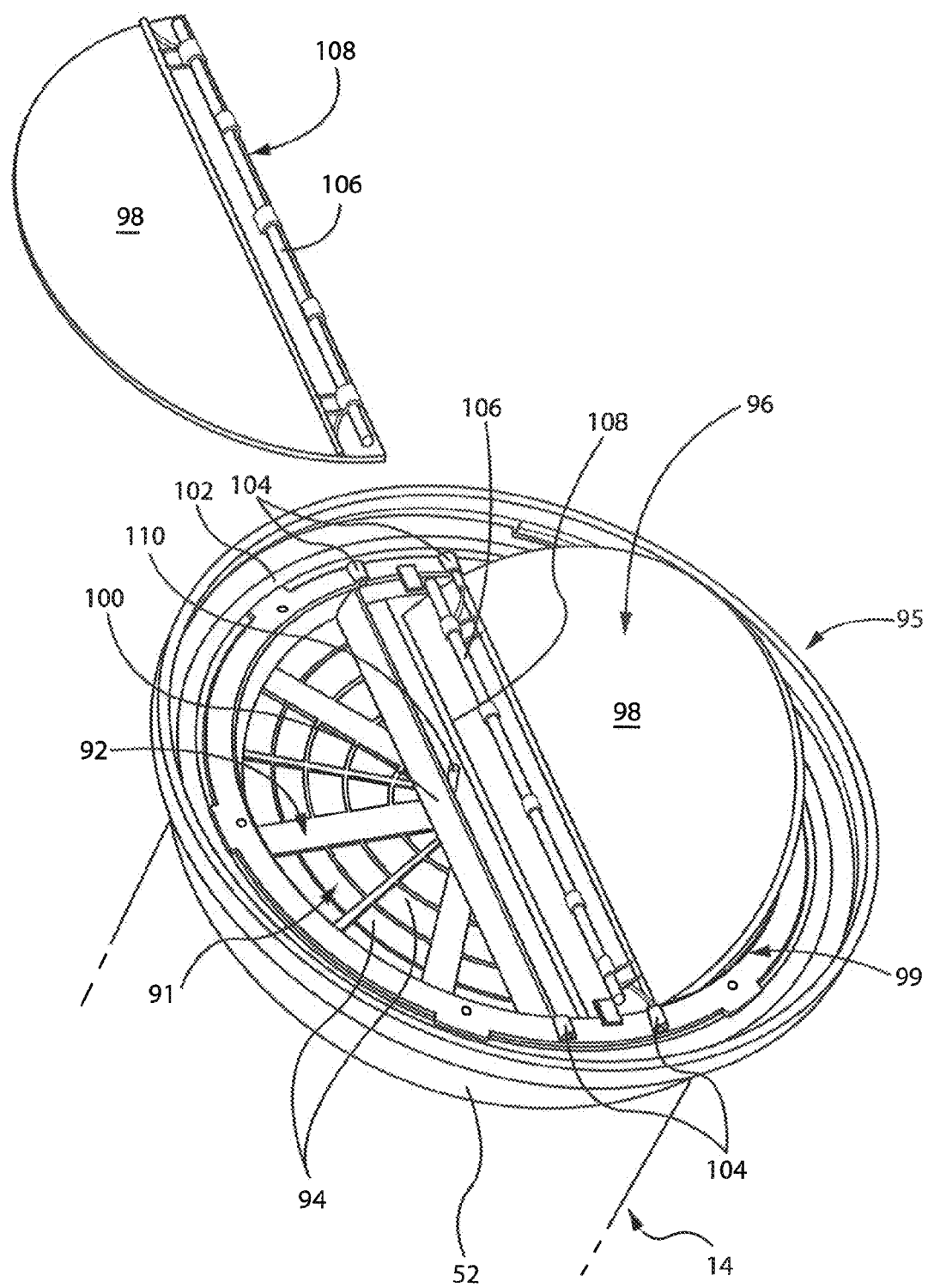
FIG. 4 is a view similar to FIG. 3 and shows one of the damper doors or flaps in an open position and another damper door or flap removed.

Referring to FIG. 4, when the damper flap 98 is in an open position, the flap 98 is rotated about pivot pin 104 to dispose flap 98 at an angle that is preferably less than ninety degrees relative to the closed position and less than center with respect to the axis defined by the pivot 104 and the center of gravity of the flap 98. The flap 98 is prevented from extending further by stop-bar 100 which is disposed directly behind flap 98 and is fixably attached to the inside wall 102 of bottom base 52. Specifically, notch 110 located on stop-bar 100 abuts flap 98 to prevent further rotation. This disposition provides space 99 which allows insects to pass outwardly from the housing 14 and into the retaining cage 16.

Figure 6:
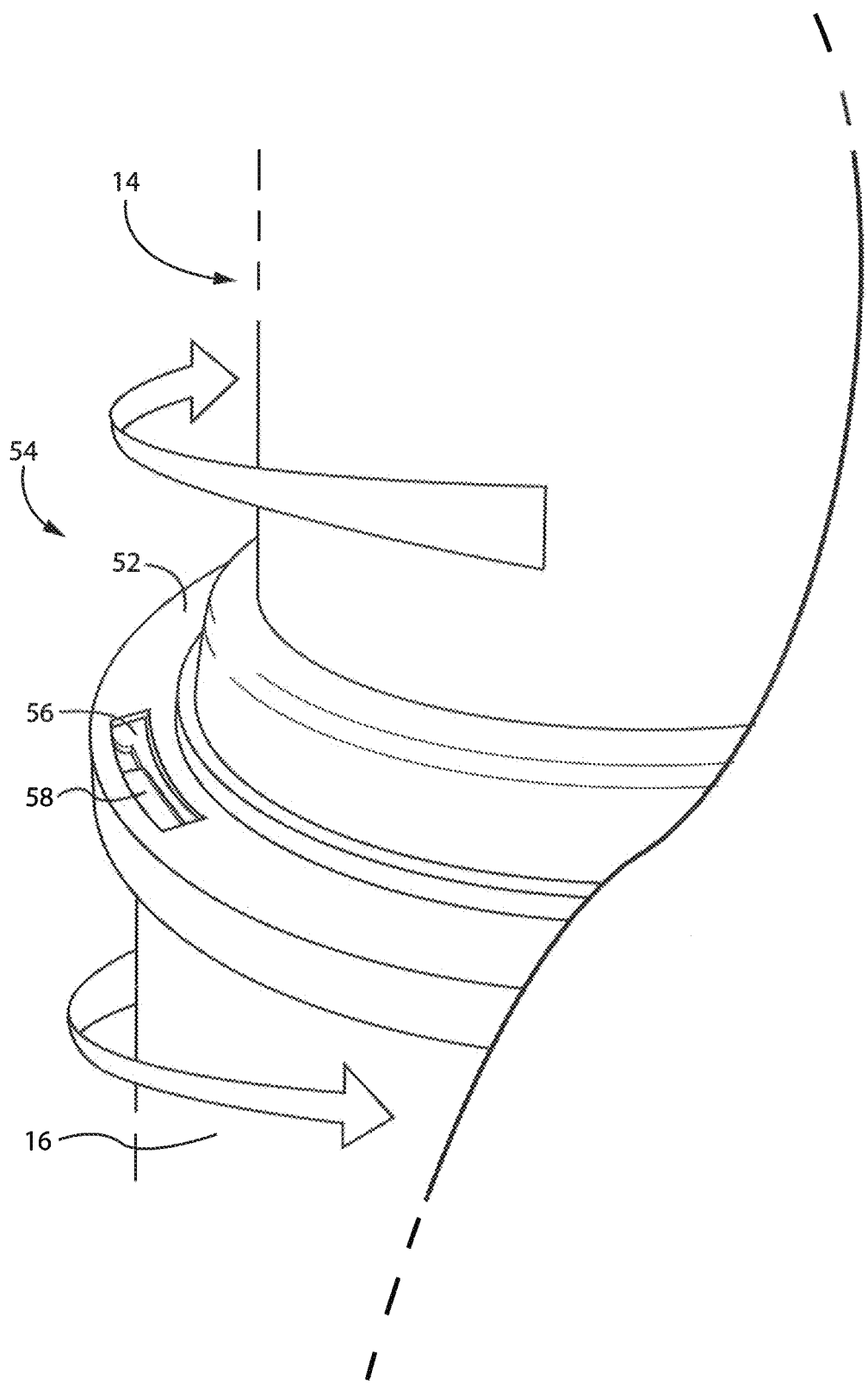
FIG. 6 is a detailed view of a locking mechanism formed between the retaining cage and the housing of the insect trap assembly taken along line 6-6 shown in FIG. 1.

Referring to FIG. 6, the locking mechanism 54 of the bottom base 52 to the retaining cage 16 consists of holes 56 at the bottom base which receive the corresponding lock pieces 58 of the top of the retaining cage 16. The lock pieces 58 are fitted with the holes 56. The user then rotates the bottom base 52 and retaining cage 16 in opposite directions to secure the locking pieces 58 within the holes 56. In a locked position, the lock pieces 58 are unable to slide out of holes 56. To unlock the retaining cage 16, the user rotates the bottom base 52 and the retaining cage in opposite rotational directions as used to secure. The lock pieces 58 are then permitted to slide out of holes 56 and the retaining cage 16 can be removed from the bottom base 52 for cleaning, or the like.

The present invention has been described in terms of the preferred embodiment, and it is recognized that equivalents, alternatives, and modifications, aside from those expressly stated, are possible and within the scope of the appending claims.

What is claimed is:

1. An insect trap comprising:
   a housing comprising:
      a roof defined by an exterior surface and an interior surface;
      a housing body depending downwardly below the roof, the housing body defined by an open top, an inner surface, and an open bottom; and
      a cage removably attached to the open bottom of the housing body and defined by an open top, an inner surface, and a closed bottom;
   a light source attached to the roof;
   an attractant disposed on the inner surface of the housing body and configured to release carbon dioxide;
   a first screen disposed across the open top of the housing body, the first screen having a plurality of passages that are each shaped to allow air and insects to pass through the first screen;
   a second screen disposed across the open bottom of the housing body, the second screen having a plurality of passages that are each shaped to allow air and insects to pass through the second screen;
   a fan assembly surrounded by the housing body and disposed between the first screen and the second screen, the fan assembly being supported by the inner surface of the housing body and including a rotatable fan blade configured to draw air through the housing in a direction from the first screen toward the second screen; and
   a damper assembly secured to the housing body below the second screen, the damper assembly comprising:
      a first and a second damper shield, each damper shield having a generally semi-circular planar shape defined by an arc connected at both ends by a straight edge;
      a coupling arrangement that independently couples each of the first and second damper shields to the housing body such that each damper shield is rotatably attached to the housing body such that the first and second damper shields independently swing toward a closed position when the fan is off and swing toward an open position when the fan is on;
      an at least one stop bar, the at least one stop bar being configured to limit rotation of at least one of the first and second damper shields so that less than 90 degrees is provided between the closed position and the open position of the at least one of the first and second damper shields and limiting rotation of the at least one of the first and second damper shields in an opening direction; and
      a weighted rod coupled to each of the first damper shield and the second damper shield, each weighted rod positioned within a perimeter of the respective damper shield and the weighted rod extending substantially parallel to the straight edge of the respective damper shield and positioned relative to the coupling arrangement to bias the respective one of the first damper shield and the second damper shield toward the closed position.

2. An insect trap comprising:
   a housing comprising:
      a roof defined by an exterior surface and an interior surface;
      a housing body depending downwardly below the roof, the housing body defined by an open top, an inner surface, and an open bottom; and
      a cage removably attached to the open bottom of the housing body and defined by an open top, an inner surface, and a closed bottom;
   a light source attached to the roof,
   an attractant disposed on the inner surface of the housing body and configured to release carbon dioxide;
   a first screen disposed across the open top of the housing body, the first screen having a plurality of passages that are each shaped to allow air and insects to pass through the first screen;
   a second screen disposed across the open bottom of the housing body, the second screen having a plurality of passages that are each shaped to allow air and insects to pass through the second screen;
   a fan assembly surrounded by the housing body and disposed between the first screen and the second screen, the fan assembly being supported by the inner surface of the housing body and including a rotatable fan blade configured to draw air through the housing in a direction from the first screen toward the second screen; and
   a damper assembly secured to the housing body below the second screen, the damper assembly comprising:
      a first and a second damper shield, each damper shield having a generally semi-circular planar shape defined by an arc connected at both ends by a straight edge;
      a coupling arrangement that independently couples each of the first and second damper shields to the housing body such that each damper shield is rotatably attached to the housing body such that the first and second damper shields swing independently toward a closed position when the fan is off and swing toward an open position when the fan is on;
      a first stop bar and a second stop bar, each stop bar being configured to limit rotation of a respective one of the first and second damper shields so that less than 90 degrees is provided between the closed position and the open position of each of the first and second damper shields; and
      a weighted rod coupled to each of the first damper shield and the second damper shield, each weighted rod positioned within a perimeter of the respective damper shield and the weighted rod extending substantially parallel to the straight edge of the respective damper shield and positioned relative to the coupling arrangement to bias the respective one of the first damper shield and the second damper shield toward the closed position.

3. The insect trap of claim 2, wherein the coupling arrangement includes a set of pivot pins and each pivot pin is disposed proximate a linear side of the generally semi-circular planar shape of a respective one of the first and the second damper shields.

4. The insect trap of claim 2, wherein the attractant is a titanium dioxide material.

5. The insect trap of claim 2, wherein the roof is transparent.

6. The insect trap of claim 2, further comprising a twist mechanism between the cage and the housing body that allows the cage to be removed from the housing body and which seals a perimeter of the open bottom of the housing body when cage is secured thereto.

7. The insect trap of claim 2, further comprising a mounting apparatus fixedly attached to the housing.

8. The insect trap of claim 7 wherein the mounting apparatus is a hanging hook attached to the roof.

9. The insect trap of claim 2, further comprising a water tray disposed circumferentially on the exterior surface of the housing.

10. The insect trap of claim 2 wherein the first stop bar and the second stop bar limit rotation of the respective damper shield in an opening direction.

* * * * *